United States Patent
S et al.

(10) Patent No.: US 10,027,575 B2
(45) Date of Patent: *Jul. 17, 2018

(54) SYSTEM AND METHOD FOR MULTIPATH COMMUNICATION IN AN AIRCRAFT

(71) Applicant: HCL Technologies Limited, Uttar Pradesh (IN)

(72) Inventors: Jayaramakrishnan S, Karnataka (IN); Sourav Dey, Karnataka (IN)

(73) Assignee: HCL TECHNOLOGIES LIMITED (IN)

(*) Notice: Subject to any disclaimer, the term of this patent is extended or adjusted under 35 U.S.C. 154(b) by 53 days.

This patent is subject to a terminal disclaimer.

(21) Appl. No.: 15/063,841

(22) Filed: Mar. 8, 2016

(65) Prior Publication Data
US 2016/0352621 A1 Dec. 1, 2016

(30) Foreign Application Priority Data
May 30, 2015 (IN) .......................... 1560/DEL/2015

(51) Int. Cl.
| H04L 12/28 | (2006.01) |
| H04L 12/46 | (2006.01) |
| H04L 12/707 | (2013.01) |
| H04B 7/185 | (2006.01) |
| H04L 12/801 | (2013.01) |

(52) U.S. Cl.
CPC ......... H04L 45/24 (2013.01); H04B 7/18502 (2013.01); H04L 47/193 (2013.01)

(58) Field of Classification Search
CPC ... H04B 7/185; H04B 7/18502; H04L 12/707; H04L 12/801; H04L 47/193; H04L 45/24
See application file for complete search history.

(56) References Cited

U.S. PATENT DOCUMENTS

| 6,850,962 B1 | 2/2005 | Povolny et al. |
| 8,611,317 B2 | 12/2013 | Banerjea et al. |
| 8,793,391 B2 | 7/2014 | Hsu et al. |
| 2008/0141315 A1* | 6/2008 | Ogilvie ................ H04N 7/15 725/77 |
| 2009/0034498 A1* | 2/2009 | Banerjea ............ H04W 92/18 370/338 |

(Continued)

OTHER PUBLICATIONS

John G. Apostolopoulos & Mitchell D. Trott, Path Iversity for Enhanced Media Streaming, Aug. 2004, No. of pp. 9, IEEE Communications Magazine, special issue on "Proxy Support for Streaming on the Internet".

*Primary Examiner* — Yemane Mesfin
*Assistant Examiner* — Abdelillah Elmejjarmi
(74) *Attorney, Agent, or Firm* — Hayes Soloway P.C.

(57) ABSTRACT

Disclosed is a method and seat centric device for providing data over a plurality of communication channels inside an aircraft. In one aspect, the method comprises obtaining a request from a user device and identifying data associated to the request. The method further comprises, dividing the data in to a plurality of data packets utilizing a multipath protocol and identifying at least one active communication channels between the seat centric device and the user device. The method furthermore comprises providing the plurality of data packets associated with the request simultaneously over the at least one active communication channels between the seat centric device and the user device.

13 Claims, 4 Drawing Sheets

(56) References Cited

U.S. PATENT DOCUMENTS

2013/0035079 A1* 2/2013 O'Doherty .......... H04W 76/021
 455/414.1
2015/0049640 A1* 2/2015 Ou ......................... H04L 45/24
 370/254

* cited by examiner

SYSTEM AND METHOD FOR MULTIPATH COMMUNICATION IN AN AIRCRAFT

CROSS-REFERENCE TO RELATED APPLICATIONS AND PRIORITY

The present application claims benefit from Indian Complete Patent Application No. 1560/DEL/2015, filed on May 30, 2015, the entirety of which is hereby incorporated by reference.

TECHNICAL FIELD

The present subject matter described herein, in general, relates to a seat centric device and a method for providing data over a plurality of communication channels, and more particularly a seat centric device and a method for providing data over a plurality of communication channels inside an aircraft.

BACKGROUND

In modern air transport industry, In-Flight Entertainment (IFE) systems play a very important role. Furthermore, airlines are continuously working to bring more comfort and passenger centric services to improve the quality of service. Generally the IFE comprises of a seat back display unit. Generally, the seat back display unit provides option for a passenger travelling in the aircraft to view movies, songs, graphs, flight information, destination information, services, games etc.

Typically, the passengers may also connect their own devices to the existing seat back devices using single communication interfaces for example Wi-Fi or Bluetooth. Generally, passenger often experiences connection failure, low band width when connected with a single communication interface. Furthermore, as there is no centralized control, the data transfer between the devices is not optimized.

SUMMARY

Before the present seat centric device(s) and methods, are described, it is to be understood that this application is not limited to the particular seat centric device(s), and methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application. This summary is provided to introduce aspects related to a seat centric device(s) and a method for providing data over a plurality of communication channels inside an aircraft. This summary is not intended to identify essential features of the claimed subject matter nor is it intended for use in determining or limiting the scope of the claimed subject matter.

In one implementation, a seat centric device(s) for providing data over a plurality of communication channels inside an aircraft. In one aspect, the seat centric device(s) may obtain a request from a user device(s), wherein the request is received via at least one of a plurality of user device communication channels. Further, the seat centric device(s) may identify data associated to the request. Further, the data may be identified from local repository or a central repository or a seat centric device repository located inside the seat or the seat centric device. Upon identification, the seat centric device(s) may divide the data in to a plurality of data packets utilizing a multipath protocol, wherein the data is divided in to the plurality of data packets at a transport layer. Further to dividing, the seat centric device(s) may identify at least one active communication channels between the seat centric device(s) and the user device, wherein the at least one active communication channels is identified based on a mapping of the at least one of the plurality of user device communication channels and a at least one of a plurality of seat centric device communication channels. Subsequently, the seat centric device(s) may provide the plurality of data packets associated with the request simultaneously over the at least one active communication channels between the seat centric device(s) and the user device(s).

In another implementation, a method for providing data over a plurality of communication channels inside an aircraft is disclosed. In one aspect, the method may comprise obtaining a request from a user device, wherein the request is received via at least one of a plurality of user device communication channels. Further, the method may comprise, identifying, data associated to the request, wherein the data is identified from a repository. Furthermore the method may comprise, dividing the data in to a plurality of data packets utilizing a multipath protocol, wherein the data is divided in to the plurality of data packets at a transport layer. Upon dividing, the method may comprise, identifying at least one active communication channels between the seat centric device and the user device, wherein the at least one active communication channels is identified based on a mapping of the at least one of the plurality of user device communication channels and a at least one of a plurality of seat centric device communication channels. Subsequent to identifying the method may comprise, the plurality of data packets associated with the request simultaneously over the at least one active communication channels between the seat centric device and the user device.

In yet another implementation, non-transitory computer readable medium embodying a program executable in a computing device for providing data over a plurality of communication channels inside an aircraft is disclosed. The program may comprise a program code for obtaining a request from a user device, wherein the request is received via at least one of a plurality of user device communication channels. The program may comprise a program code for identifying data associated to the request, wherein the data is identified from a repository. The program may comprise a program code for dividing the data in to a plurality of data packets utilizing a multipath protocol, wherein the data is divided in to the plurality of data packets at a transport layer. The program may comprise a program code for identifying at least one active communication channels between the seat centric device and the user device, wherein the at least one active communication channels is identified based on a mapping of the at least one of the plurality of user device communication channels and a at least one of a plurality of seat centric device communication channels. The program may comprise a program code for providing the plurality of data packets associated with the request simultaneously over the at least one active communication channels between the seat centric device and the user device.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and seat centric device disclosed in the document and the figures.

The present subject matter is described detail with reference to the accompanying figures. In the figures, the leftmost digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any seat centric device s and methods similar or equivalent to those described herein can be used in the practice or testing of embodiments of the present disclosure, the exemplary, seat centric device s and methods are now described. The disclosed embodiments are merely examples of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

In an implementation, a seat centric device and method for providing data over a plurality of communication channels to a user device inside an aircraft, is described. In the implementation, a request from a user device may be obtained. In one example, the request may comprise a request for a video, a song, a movie, a webpage, a game and the like. The request may be obtained via a user device communication channels. In an example, the user device communication channels may be one or more of Wi-Fi, 3G, 4G, and GPRS etc.

Upon obtaining the request, the request may be analyzed and data associated to the request may be identified. Further, the data may be identified from a local repository or a main server. Subsequent to identification of data, the data may be divided in to a plurality of data packets utilizing a multipath protocol. In an example the multipath protocol may be one of Multipath Transmission Control Protocol and Stream Control Transmission Protocol. Further to division of data, at least one active communication channel between the seat centric device and the user is identified. The at least one active communication channels may be identified based on a mapping of the user device communication channels and seat centric device communication channels. Upon identification of at least one active communication channel, the plurality of data packets are provided to the user device simultaneously over the at least one active communication channels.

Figure 1:
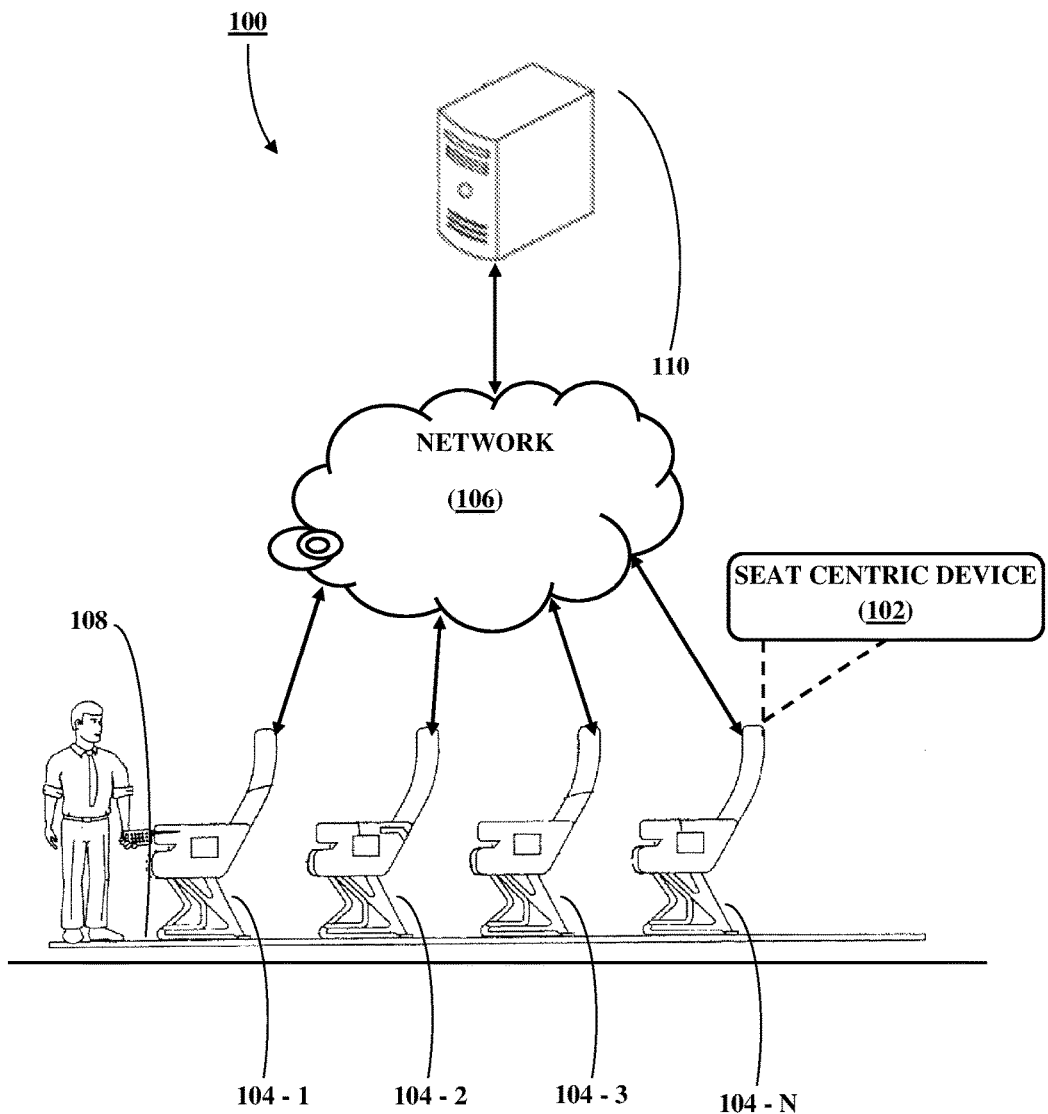
FIG. 1(a) illustrates a network implementation of a seat centric device(s) for providing data over a plurality of communication channels in an aircraft, in accordance with an embodiment of the present subject matter.
FIG. 1(b) illustrates a network implementation of the seat centric device(s) for providing data over a plurality of communication channels in an aircraft, in accordance with an embodiment of the present subject matter.
Figure 1:
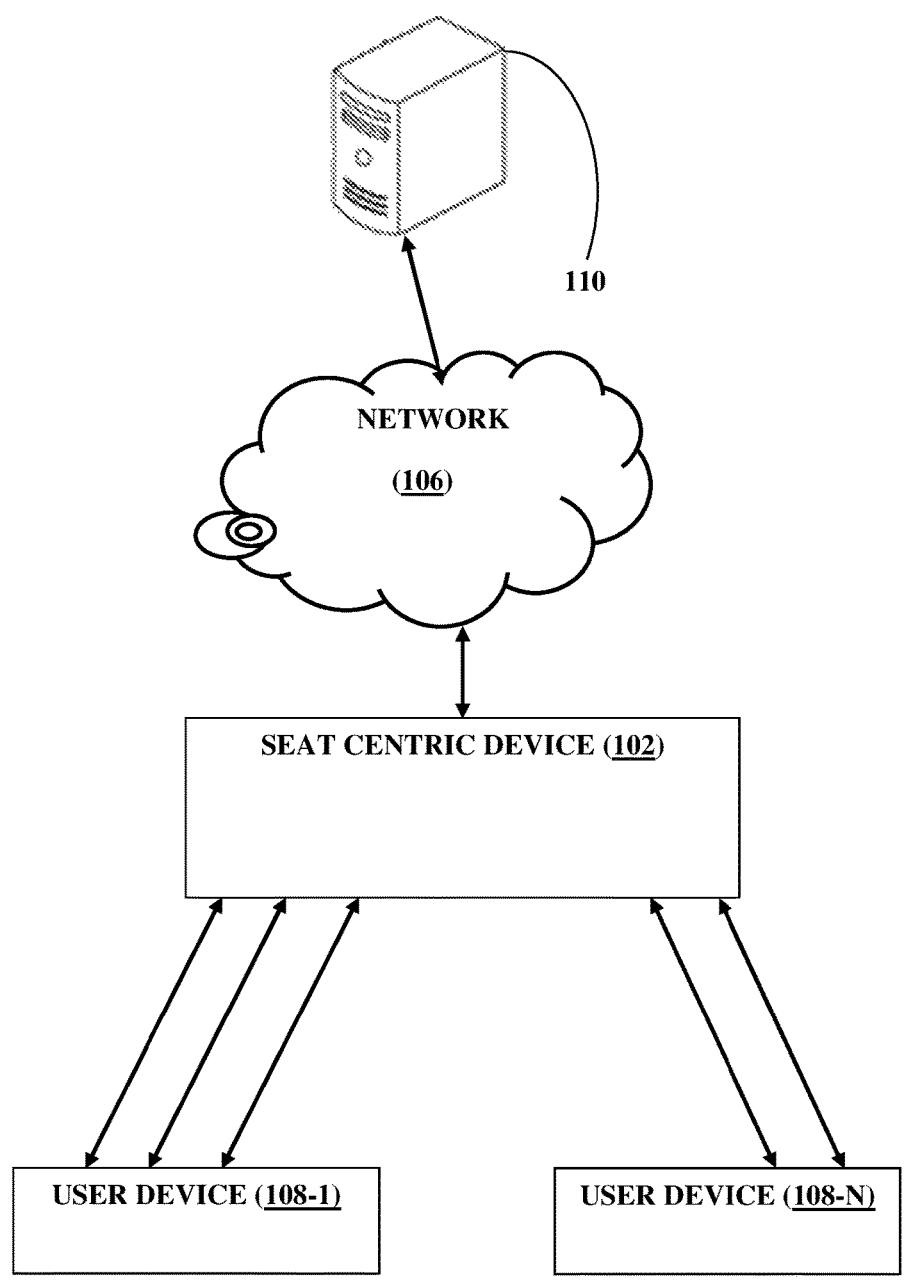

Referring now to FIG. 1(a), and FIG. 1(b), a network implementation of a seat centric device 102 for providing data over a plurality of communication channels to a user device 108 inside an aircraft, in accordance with an embodiment of the present subject matter may be described. In one embodiment, the present subject matter is explained considering that the seat centric device 102 may be implemented as a standalone seat centric device 102 connected to central database 110 via network 106 and user device(s) 108.

In another embodiment, the seat centric device 102 may be implemented inside a passenger seat 104 of the aircraft, the passenger seat 104 hereinafter referred to as a seat(s) 104. It will also be understood that the seat centric device 102 may be accessed by multiple users through one or more user devices 108-1, 108-2 . . . and 108-N, collectively referred to as user devices 108 hereinafter, or applications residing on the user devices 108. Examples of the user devices 108 may include, but are not limited to, a portable computer, a personal digital assistant, a handheld device, and a workstation. The user devices 108 are communicatively coupled to the seat centric device 102 through one or more communication channels. Further, the seat centric device 102 may be coupled with the central repository by a network 106. Furthermore, the seat centric device 102 may be directly coupled to one or more local repository.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
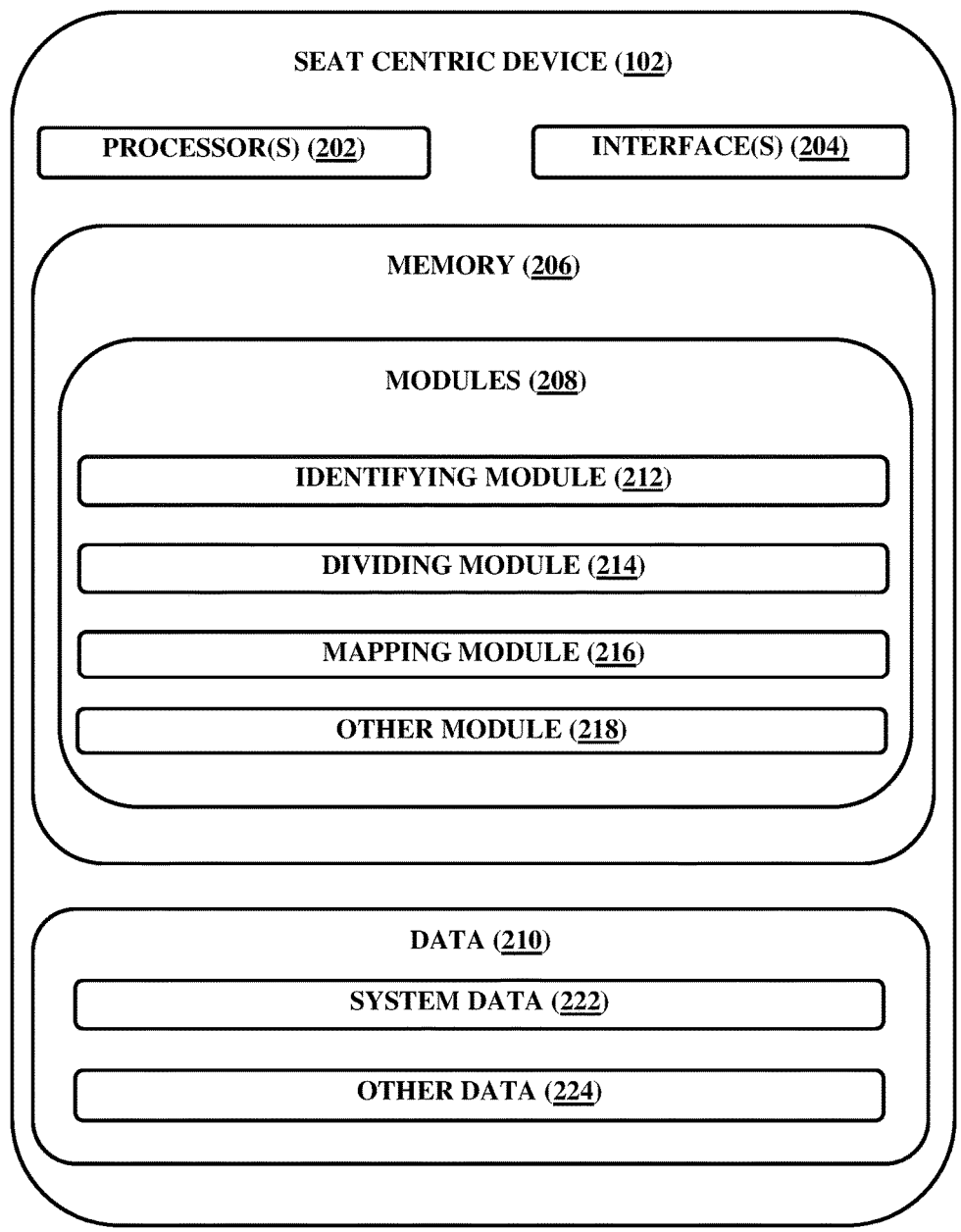
FIG. 2 illustrates the seat centric device(s), in accordance with an embodiment of the present subject matter.

Referring now to FIG. 2, the seat centric device 102 is illustrated in accordance with an embodiment of the present subject matter. In one embodiment, the seat centric device 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the seat centric device 102 to interact with the user directly or through the client devices 104. Further, the I/O interface 204 may enable the seat centric device 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an identifying module 212, a dividing module 214, a mapping module 216 and other module 218. The other modules 218 may include programs or coded instructions that supplement applications and functions of the seat centric device 102. The modules 208 described herein may be implemented as software modules that may be executed in the cloud-based computing environment of the seat centric device 102.

The memory 206, amongst other things, serves as a repository for storing data processed, received, and generated by one or more of the modules 208. The memory 206 may include data generated as a result of the execution of one or more modules in the other module 220. In one implementation, the memory may include data 210. Further, the data 210 may include a seat centric device data 222 for storing data processed, received, and generated by one or more of the modules 208. Furthermore, the data 210 may include other data 224 for storing data generated as a result of the execution of one or more modules in the other module 220. In one implementation the other data 224 may also comprises entertainment data such as, movies, songs, maps, e-books, and the like.

Construe an example, where a user is seated in a passenger seat of an aircraft. In course of his travel, the user wishes to watch a movie on his device. In this example, the device may be a laptop. In the said example, the user may request the seat centric device 102 for the movie. In the implementation, at first, a user may use the user device 108 connect to the seat centric device 102 to request for the movie.

In one other implementation, the seat centric device 102 may provide the user device 108 with a multipath communication application initially. The user may install the received multipath communication application on the user device 108 to enable multipath communication, and request for the movie.

Identifying Module 212

Referring to FIG. 2, in an implementation, a seat centric device 102 and method for providing, is described. In the implementation, the identifying module 212 may obtain a request from a user device. In an implementation, the request may be obtained over a user device communication channel In an example, the request may be a request for video file, audio file, webpage, document, and the like. Further, in the example, the user device communication channels may comprise 3G, Wi-Fi, 4G, GPRS and the like. In the above described example of user travelling in an aircraft, the identifying module 212 may obtain a request for a movie from a user device.

In the implementation, the identifying module 212 may identify the data associated with the request. In one example, the data may be identified from the local repository or a seat centric device repository located inside the seat or the seat centric device. In one more example, the data may be obtained from the central repository. In an example, the central repository may comprise SATCOM (satellite communication) server, game server, application server, video server, audio server and like. In above described example of the user in the passenger seat of the aircraft, the identifying module 212 may identify the data associated with the movie request from the central movie server.

Dividing Module 214

In the embodiment, subsequent to the identifying the data associate with the request, the dividing module 214 may divide the data in to a plurality of data packets utilizing a multipath protocol, wherein. In one example, the data may be divided in to the plurality of data packets at a transport layer. In the example, the data may be divided based on initialization of multipath protocol. In an example, the dividing may be performed based on predefined criteria. In one more example the dividing may be performed based on a predefined algorithm. In one other example, multipath protocol may be Multipath Transmission Control Protocol (MPTCP) or Stream Control Transmission Protocol (SCTP). IN the example of user in the passenger seat of the aircraft, dividing module 214 may is divided the identified movie file in to multiple packets of movie file for further transmission to the user device. In one other implementation, the dividing module 214 may store the plurality of data packets in the system data 222.

Mapping Module 216

In the implementation, further to dividing the data in to plurality of data packets, the mapping module 216 may identify active communication channels between the seat centric device and the user device. Further, the active communication channels may be identified based on a mapping of the user device communication channels and seat centric device communication channels. In an example the seat centric device communication channels may be Wi-Fi, Bluetooth, EDGE, 2G, 3G, 4G, 5G, USB cable, wired connection and mobile network. In an example the user device communication channels may be Wi-Fi, Bluetooth, EDGE, 2G, 3G, 4G, 5G, USB cable, wired connection and mobile network. In an example the active communication channels may be Wi-Fi, Bluetooth, EDGE, 2G, 3G, 4G, 5G, USB cable, wired connection and mobile network. Further, the mapping may be understood as the linking of similar communication channels between the user device communication channels and seat centric device communication channels. For example, mapping of Wi-Fi of the seat centric device and Wi-Fi of users device, and Bluetooth of the seat centric device and Bluetooth of users device and like. The active communication channels may be understood as the communication channels that are mapped. Further, the unmapped channels may be switched off for power saving.

In the example of user traveling in the passenger seat of the aircraft and requesting for a movie on his laptop. In the said example, the communication channels that are available in the laptop may be Wi-Fi and Bluetooth. In the said example, the seat centric device communication channels may comprise Wi-Fi, Bluetooth, EDGE, 2G, 3G, 4G, 5G, USB cable, wired connection and mobile network. In the example, mapping module 216 may identify active communication channels between the seat centric device and the user device. The mapping module 216 may map the Wi-Fi and Bluetooth communication channels of user device 108 with respective Wi-Fi and Bluetooth of seat centric device 102 and identify Wi-Fi and Bluetooth communication channels as active and the unmapped 3G communication channel as inactive. In an example the mapping module 216 may switch off the 3G communication channel for power saving.

Upon identifying the active communication channels, the mapping module 216 may provide the plurality of data packets associated with the request simultaneously over the active communication channels between the seat centric device and the user device. In the example of user traveling in the passenger seat of the aircraft, the movie packets may be provided to the user device simultaneously over the active communication channels Wi-Fi and Bluetooth. Thus increasing the speed of data transfer and reduction in power consumption. In one other implementation, the mapping module 216 may store data, system data 222.

Exemplary embodiments discussed above may provide certain advantages. Though not required to practice aspects of the disclosure, these advantages may include those provided by the following features.

Some embodiments enable the seat centric device and the method to monitor the power consumption.

Some embodiments enable the seat centric device and the method to increase the bandwidth of data transfer.

Some embodiments enable the seat centric device and the method to optimize power consumption.

Some embodiments enable the seat centric device and the method to increase the bandwidth during data transmission.

Some embodiments enable the seat centric device and the method to increase the speed of data transmission.

Some embodiments enable the seat centric device and the method to manage the communication channels.

Figure 3:
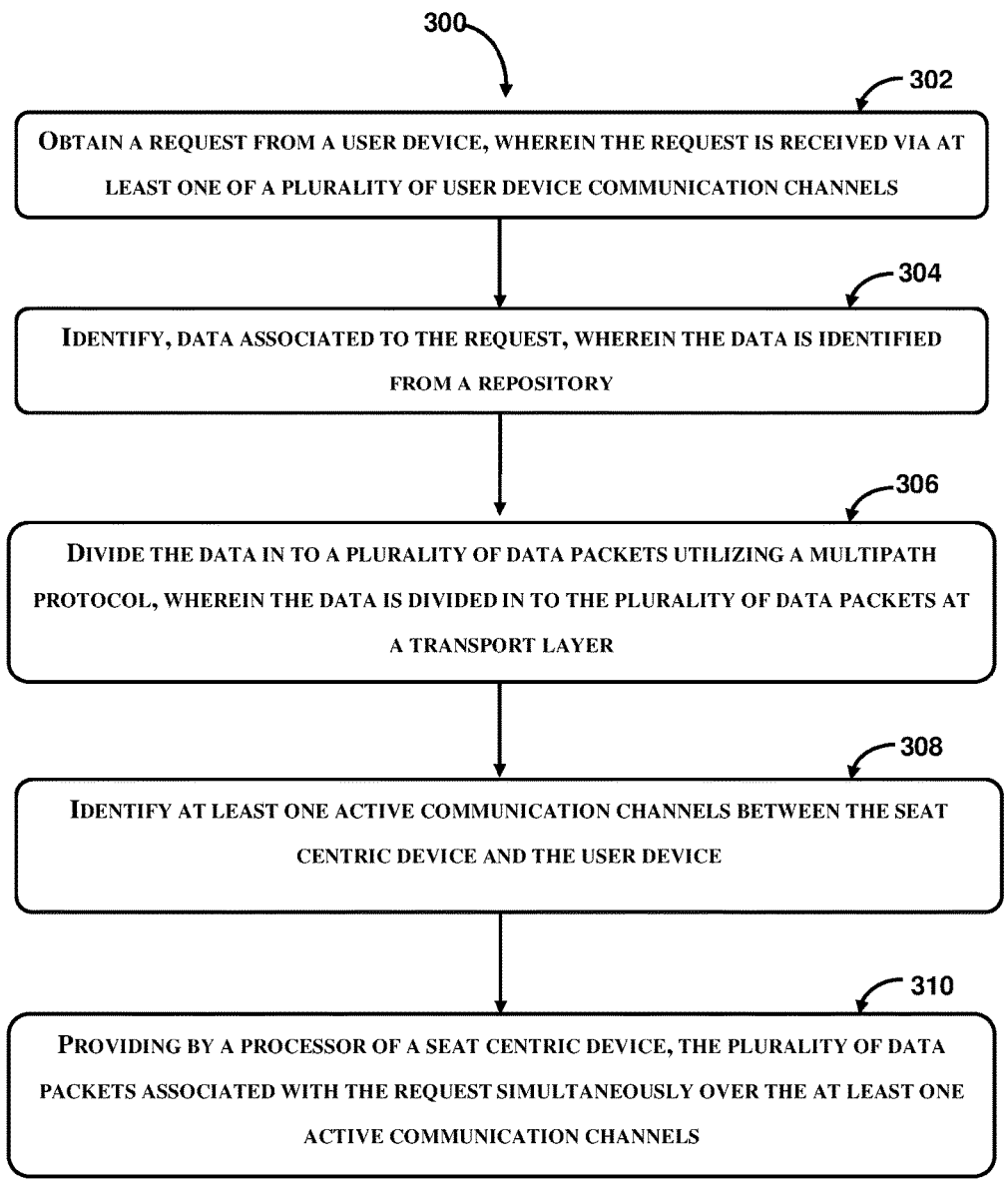
FIG. 3 illustrates a method for providing data over a plurality of communication channels in an aircraft, in accordance with an embodiment of the present subject matter.

Referring now to FIG. 3, a method 300 for providing data over a plurality of communication channels in an aircraft is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described seat centric device 102.

At block 302, a request from a user device obtaining. The request may be received via a user communication channel. In an implementation, the identifying module 212 may obtain a request from a user device and store a request from a user device in system data 222.

At block 304, data associated to the request is identified. Further, the data may be identified from a local repository or a central repository or a seat centric device repository located inside the seat or the seat centric device. In the implementation, the identifying module 212 may identify data associated to the request and store the data in system data 222.

At block 306, the data may be divided in to a plurality of data packets utilizing a multipath protocol. Further, the data may be divided in to the plurality of data packets at a transport layer. In the implementation, the divider module 214 may divide the data in to a plurality of data packets utilizing a multipath protocol and store the data packets in the system data 222.

At block 308, at least one active communication channels between the seat centric device and the user device may be identified. Further, the at least one active communication channels is identified based on a mapping of the at least one of the plurality of user device communication channels and a at least one of a plurality of seat centric device communication channels. In the implementation, the mapping module 216 may identify at least one active communication channels between the seat centric device and the user device and store the mapping data in system data 222.

At block 310, the plurality of data packets associated with the request are provided simultaneously over the at least one active communication channels between the seat centric device and the user device. In the implementation, the mapping module 216 may provide the plurality of data packets associated with the request to the user device and also store the data packets in system data 222.

Exemplary embodiments discussed above may provide certain advantages. Though not required to practice aspects of the disclosure, these advantages may include a method for providing data over a plurality of communication channels in an aircraft.

Although implementations for methods and seat centric device s for providing a context aware suggestion have been described in language specific to structural features and/or methods, it is to be understood that the appended claims are not necessarily limited to the specific features or methods described. Rather, the specific features and methods are disclosed as examples of implementations providing data over a plurality of communication channels in an aircraft.

We claim:

1. A method for providing data over a plurality of communication channels between a seat centric device and a user device inside an aircraft, the method comprising:
  obtaining, by a processor of a seat centric device, a request from a user device, wherein the request is received via at least one of a plurality of user device communication channels;
  identifying, by the processor of the seat centric device, data upon analyzing the request, wherein the data is identified from a repository;
  dividing, by the processor of the seat centric device, the data in to a plurality of data packets utilizing a multipath protocol, wherein the data is divided in to the plurality of data packets at a transport layer;
  identifying, by the processor of the seat centric device, at least one active communication channel between the seat centric device and the user device, wherein the at least one active communication channel is identified based on a mapping of at least one of a plurality of user device communication channels and at least one of a plurality of seat centric device communication channels;

providing, by the processor of the seat centric device, the plurality of data packets associated with the request simultaneously over the at least one active communication channels between the seat centric device and the user device; and switching one or more unmapped communication channel, associated to the seat centric device, to an OFF mode.

2. The method of claim 1, wherein the multipath protocol is one of Multipath Transmission Control Protocol and Stream Control Transmission Protocol.

3. The method of claim 1, wherein the plurality of seat centric device communication channels comprises at least two of Wi-Fi, Bluetooth, EDGE, 2G, 3G, 4G, 5G, USB cable, wired connection and mobile network.

4. The method of claim 1, wherein the plurality of user device communication channels comprises at least two of Wi-Fi, Bluetooth, EDGE, 2G, 3G, 4G, 5G, USB cable, wired connection and mobile network.

5. The method of claim 3, wherein the at least one active communication channel comprises Wi-Fi, Bluetooth, EDGE, 2G, 3G, 4G, 5G, USB cable, wired connection and mobile network.

6. The method of claim 3, wherein the repository is one of a seat centric device repository, and a central repository.

7. A seat centric device for providing data over a plurality of communication channels inside between a seat centric device and a user device inside an aircraft, the seat centric device comprising: a memory; and a processor coupled to the memory, wherein the processor is capable of executing instructions to perform steps of:

obtaining a request from a user device, wherein the request is received via at least one of a plurality of user device communication channels;

identifying data upon analyzing the request, wherein the data is identified from a repository;

dividing the data in to a plurality of data packets utilizing a multipath protocol, wherein the data is divided in to the plurality of data packets at a transport layer;

identifying at least one active communication channel between the seat centric device and the user device, wherein the at least one active communication channel is identified based on a mapping of at least one of a plurality of user device communication channels and at least one of a plurality of seat centric device communication channels; and providing the plurality of data packets associated with the request simultaneously over the at least one active communication channel between the seat centric device and the user device; and switching one or more unmapped communication channel, associated to the seat centric device, to an OFF mode.

8. The seat centric device of claim 7, wherein the multipath protocol is one of Multipath Transmission Control Protocol and Stream Control Transmission Protocol.

9. The seat centric device of claim 7, wherein the plurality of seat centric device communication channels comprises at least two of Wi-Fi, Bluetooth, EDGE, 2G, 3G, 4G, 5G, USB cable, wired connection and mobile network.

10. The seat centric device of claim 7, wherein the plurality of user device communication channels comprises at least two of Wi-Fi, Bluetooth, EDGE, 2G, 3G, 4G, 5G, USB cable, wired connection and mobile network.

11. The seat centric device of claim 7, wherein the at least one active communication channel comprises Wi-Fi, Bluetooth, EDGE, 2G, 3G, 4G, 5G, USB cable, wired connection and mobile network.

12. The seat centric device of claim 7, wherein the repository is one of a seat centric device repository, and a central repository.

13. A non-transitory computer program product having embodied thereon a computer program for providing data over a plurality of communication channels inside between a seat centric device and a user device inside an aircraft, the computer program product storing instructions, the instructions comprising instructions for:

obtaining a request from a user device, wherein the request is received via at least one of a plurality of user device communication channels;

identifying, data upon analyzing to the request, wherein the data is identified from a repository;

dividing the data in to a plurality of data packets utilizing a multipath protocol, wherein the data is divided in to the plurality of data packets at a transport layer;

identifying at least one active communication channel between the seat centric device and the user device, wherein the at least one active communication channel is identified based on a mapping of at least one of a plurality of user device communication channels and at least one of a plurality of seat centric device communication channels; and providing the plurality of data packets associated with the request simultaneously over the at least one active communication channels between the seat centric device and the user device;

switching one or more unmapped communication channel, associated to the seat centric device, to an OFF mode.

* * * * *